United States Patent
Masuda et al.

(10) Patent No.: US 12,347,469 B1
(45) Date of Patent: Jul. 1, 2025

(54) REPOSITIONING OPERATION ON A TAPE MEDIUM BASED ON DATASET INFORMATION

(71) Applicant: International Business Machines Corporation, Armonk, NY (US)

(72) Inventors: Setsuko Masuda, Tokyo (JP); Tsuyoshi Miyamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/602,085

(22) Filed: Mar. 12, 2024

(51) Int. Cl.
G11B 5/55 (2006.01)
G11B 21/08 (2006.01)

(52) U.S. Cl.
CPC .......... G11B 5/5508 (2013.01); G11B 21/086 (2013.01); *G11B 2220/956* (2013.01)

(58) Field of Classification Search
None
See application file for complete search history.

(56) References Cited

U.S. PATENT DOCUMENTS

| | | | | |
|---|---|---|---|---|
| 4,989,101 | A * | 1/1991 | Sasho | G11B 27/002 386/207 |
| 5,805,208 | A * | 9/1998 | Meierdiercks | H04N 5/253 348/E5.049 |
| 5,923,494 | A * | 7/1999 | Arisaka | G11B 5/5504 |
| 6,268,975 | B1 | 7/2001 | Bickers | |
| 11,120,831 | B1 * | 9/2021 | Watanabe | G11B 15/43 |
| 11,437,070 | B1 * | 9/2022 | Miyamura | G06F 3/061 |
| 2003/0016465 | A1 * | 1/2003 | Bui | G11B 5/584 |
| 2007/0236817 | A1 * | 10/2007 | Taruisi | G06F 3/0643 |
| 2008/0266699 | A1 * | 10/2008 | Masuda | G11B 5/584 |
| 2009/0303633 | A1 * | 12/2009 | Itagaki | G11B 5/584 360/77.12 |
| 2012/0307399 | A1 * | 12/2012 | Hoerger | G11B 20/1201 360/134 |
| 2013/0083640 | A1 * | 4/2013 | Takahashi | G11B 7/00458 369/53.26 |
| 2015/0199980 | A1 * | 7/2015 | Aoki | G11B 5/00817 360/78.02 |

(Continued)

OTHER PUBLICATIONS

Miyamura et al., "Full Data Set Directory for Magnetic Tape Recording Media", U.S. Appl. No. 17/982,387, filed Nov. 7, 2022, 76 pages.

*Primary Examiner* — Peter Vincent Agustin
(74) *Attorney, Agent, or Firm* — Stosch Sabo

(57) ABSTRACT

A computer-implemented method, a computer program product, and a computer system for repositioning operation on a tape medium based on dataset information. A computer system obtains dataset information of a dataset on a tape medium in a sync operation, where the dataset information includes positions of data in the dataset. A computer system sends the dataset information of the dataset to a host. In response to starting a repositioning operation, a computer system receives from the host the dataset information of the dataset. A computer system reads the dataset information of the dataset. A computer system repositions to a target on the tape medium, based on the dataset information of the dataset, where a tape drive refers to the dataset information and moves to a position immediately before the target.

15 Claims, 3 Drawing Sheets

(56) References Cited

U.S. PATENT DOCUMENTS

| | | | |
|---|---|---|---|
| 2016/0254014 A1* | 9/2016 | Biskeborn | G11B 5/4893 360/48 |
| 2017/0061996 A1* | 3/2017 | Hasegawa | G11B 5/588 |
| 2019/0171543 A1* | 6/2019 | Nylander-Hill | G06F 17/40 |
| 2021/0118470 A1* | 4/2021 | Miyamura | G11B 5/00821 |
| 2022/0035563 A1* | 2/2022 | Miyamura | G11B 27/34 |
| 2022/0164110 A1 | 5/2022 | Abe | |
| 2022/0358967 A1 | 11/2022 | Miyamura | |
| 2023/0052640 A1 | 2/2023 | Miyamura | |

* cited by examiner

REPOSITIONING OPERATION ON A TAPE MEDIUM BASED ON DATASET INFORMATION

BACKGROUND

The present invention relates generally to tape media, and more particularly to a repositioning operation on a tape medium based on dataset information.

A tape drive that complies with the Linear Tape-Open (LTO) format writes data sent from a host in the form of a record to a tape medium in a unit called datasets. When the tape drive writes data, the drive reciprocates along lengthwise divided areas or wraps of a tape medium. To read data on the tape medium, the tape drive must first move to the beginning of the data to be read. The operation of moving the tape drive to the beginning of the data to be read is called reposition. When repositioning, the tape drive receives a record number or a filemark (FM, a mark indicating the start/end of a file) number to start reading from the host. However, the tape drive does not know where on the tape medium the required record or FM (target) is written. Therefore, Tape Directory (TD) or High Resolution Tape Directory (HRTD) is used to estimate a target location.

TD stores the number of records and FMs etc. that have been written in the area divided into two parts of each wrap on the tape medium. HRTD, a detailed version of TD, stores similar information for each wrap that is divided into 128 regions. TD or HRTD is stored in the non-volatile memory built into the cartridge called Cartridge Memory (CM) or written on the tape medium in the form of datasets. The tape drive reads out the information when the tape medium is loaded and expands the information onto the main memory. When repositioning, the tape drive refers to the TD or HRTD and searches for the region which includes the target of reposition. Then, the tape drive starts reading from the beginning of the HRTD region or from the position estimated by linear calculation using TD information. The tape drive reads datasets one by one to see if the target of reposition is included in the region. Since there is a distance between the start position and the target position, there is a case that the tape drive cannot reach to the target position or takes a very long time before reaching the target position if there is an unreadable dataset exists before the target position. Therefore, it is important to know the position of the target as accurately as possible and start reading from a position near the target position. If the resolution of TD and HRTD is increased, it is possible to start reading from just before the target position. However, the amount of data increases in proportion to the precision, making it difficult to store the increased amount of data in the main memory.

A patent application (US20220358967) discloses a method of tape repositioning management; in the method, the tape is repositioned within a data partition to read a vHRTD (virtual High Resolution Tape Directory) recorded in an EOD (End of Data) portion such as an EOD data set. Another patent application (US20230052640) discloses a method of improving write performance by enabling host data transfer immediately after a reposition command; in this method, write data from the host is accumulated in a write buffer while simultaneously moving a tape media in the tape drive to a target location. Yet another patent application (US20210118470) discloses an apparatus configured to control writing operations to a magnetic recording tape; for each of datasets being written, an end longitudinal position indicative of a physical position where a dataset is written to the magnetic recording tape is determined. In a disclosure of yet another patent application (US20220164110), a High Resolution Tape Directory (HRTD) stored in the volatile memory of a tape drive is communicated for storage in an off-tape non-volatile memory prior to unloading a tape cartridge and, in response to the tape cartridge being loaded into the tape drive, the HRTD is received from the off-tape non-volatile memory. A patent (U.S. Pat. No. 6,268,975B1) discloses methods and apparatus for locating target positions within an encoded data stream which incorporates special, reserved codewords to represent host data structure information, such as file marks and record boundaries.

SUMMARY

In one aspect, a computer-implemented method for repositioning operation on a tape medium based on dataset information is provided. The computer-implemented method includes obtaining dataset information of a dataset on a tape medium in a sync operation, where the dataset information includes positions of data in the dataset. The computer-implemented method further includes sending the dataset information of the dataset to a host. The computer-implemented method further includes, in response to starting a repositioning operation, receiving, from the host, the dataset information of the dataset. The computer-implemented method further includes reading the dataset information of the dataset. The computer-implemented method further includes repositioning to a target on the tape medium, based on the dataset information of the dataset, where a tape drive refers to the dataset information and moves to a position immediately before the target.

In another aspect, a computer program product for repositioning operation on a tape medium based on dataset information is provided. The computer program product comprises a computer readable storage medium having program instructions embodied therewith, and the program instructions are executable by one or more processors. The program instructions are executable to: obtain dataset information of a dataset on a tape medium in a sync operation, where the dataset information includes positions of data in the dataset; send the dataset information of the dataset to a host; in response to starting a repositioning operation, receive, from the host, the dataset information of the dataset; read the dataset information of the dataset; and reposition to a target on the tape medium, based on the dataset information of the dataset, where a tape drive refers to the dataset information and moves to a position immediately before the target.

In yet another aspect, a computer system for repositioning operation on a tape medium based on dataset information is provided. The computer system comprises one or more processors, one or more computer readable tangible storage devices, and program instructions stored on at least one of the one or more computer readable tangible storage devices for execution by at least one of the one or more processors. The program instructions are executable to obtain dataset information of a dataset on a tape medium in a sync operation, where the dataset information includes positions of data in the dataset. The program instructions are further executable to send the dataset information of the dataset to a host. The program instructions are further executable to, in response to starting a repositioning operation, receive, from the host, the dataset information of the dataset. The program instructions are further executable to read the dataset information of the dataset. The program instructions are further executable to reposition to a target on the tape medium, based on the dataset information of the dataset, where a tape drive refers to the dataset information and moves to a position immediately before the target.

DETAILED DESCRIPTION

Figure 1:
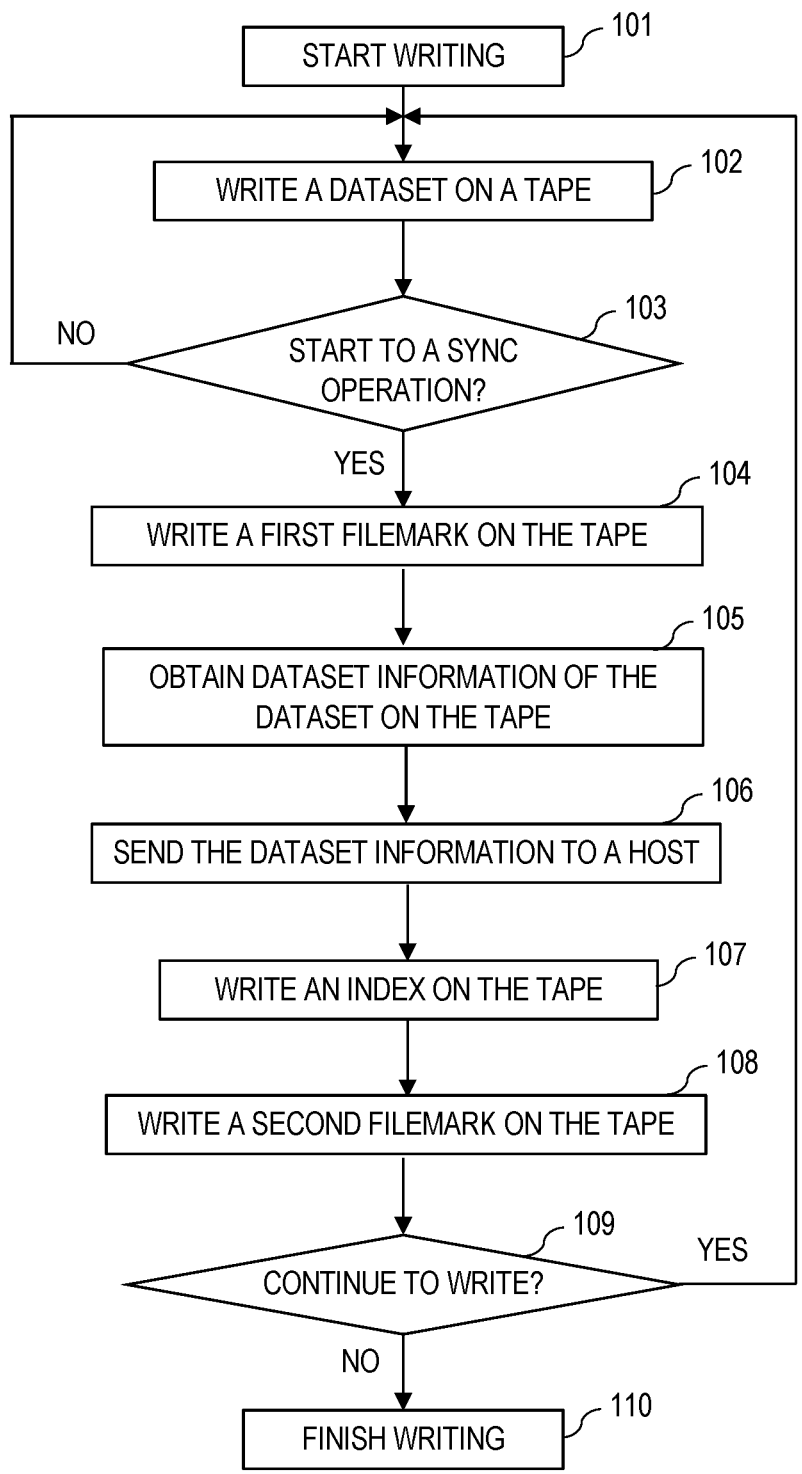
FIG. 1 is a flowchart showing operational steps of sending dataset information to a host during a sync operation on a tape medium, in accordance with one embodiment of the present invention.

Embodiments of the present invention disclose a computer-implemented method for repositioning operation on a tape medium based on dataset information. The computer-implemented method includes obtaining dataset information of a dataset on a tape medium in a sync operation, where the dataset information includes positions of data in the dataset. The computer-implemented method further includes sending the dataset information of the dataset to a host. The computer-implemented method further includes, in response to starting a repositioning operation, receiving, from the host, the dataset information of the dataset. The computer-implemented method further includes reading the dataset information of the dataset. The computer-implemented method further includes repositioning to a target on the tape medium, based on the dataset information of the dataset, where a tape drive refers to the dataset information and moves to a position immediately before the target.

Some embodiments of the computer-implemented method includes: determining whether the target is included in the dataset; in response to determining that the target is not included in the dataset, prompting the host to delete the dataset information; and finishing the repositioning operation by a conventional method without the dataset information.

In some embodiments of the computer-implemented method, the dataset information of the dataset written after a last sync operation is written in an index. In some further embodiments of the computer-implemented method, dataset information of all datasets written from a beginning of the tape medium to a current position is written in an index. In some further embodiments of the computer-implemented method, dataset information of all datasets written from a beginning of the tape medium to a current position is written after an index. In some further embodiments of the computer-implemented method, dataset information of datasets is written into an index partition on the tape medium.

In some embodiments of the computer-implemented method, the host transmits the dataset information to a tape drive, and transmitting the dataset information is by extending commands issued to perform the repositioning operation or by adding a new mode to a write buffer command.

Embodiments of the present invention disclose a computer program product for repositioning operation on a tape medium based on dataset information. The computer program product comprises a computer readable storage medium having program instructions embodied therewith, and the program instructions are executable by one or more processors. The program instructions are executable to: obtain dataset information of a dataset on a tape medium in a sync operation, where the dataset information includes positions of data in the dataset; send the dataset information of the dataset to a host; in response to starting a repositioning operation, receive, from the host, the dataset information of the dataset; read the dataset information of the dataset; and reposition to a target on the tape medium, based on the dataset information of the dataset, where a tape drive refers to the dataset information and moves to a position immediately before the target.

Other embodiments of the computer program product includes the program instructions executable to determine whether the target is included in the dataset. Other embodiments of the computer program product further includes the program instructions executable to, in response to determining that the target is not included in the dataset, prompt the host to delete the dataset information. Other embodiments of the computer program product further includes the program instructions executable to finish the repositioning operation by a conventional method without the dataset information.

In some embodiments of the computer program product, the dataset information of the dataset written after a last sync operation is written in an index. In some further embodiments of the computer program product, dataset information of all datasets written from a beginning of the tape medium to a current position is written in an index. In some further embodiments of the computer program product, dataset information of all datasets written from a beginning of the tape medium to a current position is written after an index. In some further embodiments of the computer program product, dataset information of datasets is written into an index partition on the tape medium.

In some embodiments of the computer program product, the host transmits the dataset information to a tape drive, and transmitting the dataset information is by extending commands issued to perform the repositioning operation or by adding a new mode to a write buffer command.

Embodiments of the present invention disclose a computer system for repositioning operation on a tape medium based on dataset information. The computer system comprising one or more processors, one or more computer readable tangible storage devices, and program instructions stored on at least one of the one or more computer readable tangible storage devices for execution by at least one of the one or more processors. The program instructions are executable to obtain dataset information of a dataset on a tape medium in a sync operation, where the dataset information includes positions of data in the dataset. The program instructions are further executable to send the dataset information of the dataset to a host. The program instructions are further executable to, in response to starting a repositioning operation, receive, from the host, the dataset information of the dataset. The program instructions are further executable to read the dataset information of the dataset. The program instructions are further executable to reposition to a target on the tape medium, based on the dataset information of the dataset, where a tape drive refers to the dataset information and moves to a position immediately before the target.

Other embodiments of the computer program product includes the program instructions executable to: determine whether the target is included in the dataset; in response to determining that the target is not included in the dataset, prompt the host to delete the dataset information; and finish the repositioning operation by a conventional method without the dataset information.

In some embodiments of the computer system, the dataset information of the dataset written after a last sync operation is written in an index. In some further embodiments of the computer system, dataset information of all datasets written from a beginning of the tape medium to a current position is written in an index. In some further embodiments of the computer system, dataset information of all datasets written from a beginning of the tape medium to a current position is written after an index. In some further embodiments of the computer system, dataset information of datasets is written into an index partition on the tape medium.

Embodiments of the present invention disclose a method and a system of a repositioning operation on a tape medium based on information of a dataset. In embodiments of the present invention, by referring to the information of the dataset during the repositioning operation, the method and the system can reposition to just before the dataset which includes a target location on the tape medium.

Currently, Tape Directory (TD) or High Resolution Tape Directory (HRTD) stores information up to 30 bytes at maximum, including the dataset number of a registered dataset, write pass (WP) as a number to indicate whether the dataset is new or old, the end position, the record number, and the filemark (FM) number. The information related to the dataset is referred to as dataset information. Currently, the dataset information is stored only for the dataset written on the boundary of TD or HRTD. For example, the enterprise tape drive TS1170 of the newest generation stores the dataset information for 75776 datasets as calculated from 592 wraps multiplied by 128 regions.

Each dataset has a data volume of about 10 MB, and the enterprise tape drive TS1170 has a tape capacity of 50 TB. Therefore, the tape medium has about 5 million datasets. Assuming that dataset information of 30 bytes is stored for each dataset, the amount of the dataset information will be 150 MB; the amount is calculated as follows: (30 bytes per DS)×(5 million DSs)=150 MB. Based on the assumption that new information to be stored is a complement to existing HRTD information, the amount of information can be suppressed to 8 bytes per dataset by storing only a value of difference from HRTD information; however, the total dataset information still be 40 MB. Since the enterprise tape drive TS1170 has a main memory capacity of 172 MB, 40 MB of the dataset information will use more than 20% of the capacity. It is unrealistic to allocate more than 20% of the main memory capacity.

In embodiments of the present invention, the dataset information is accumulated in the main memory of a tape driver and then transmitted from the main memory of a tape driver to a host periodically. Thus, the dataset information may be deleted from the main memory immediately after transmitted completely to the host or may be kept in the main memory if the memory has an available capacity.

Figure 3:
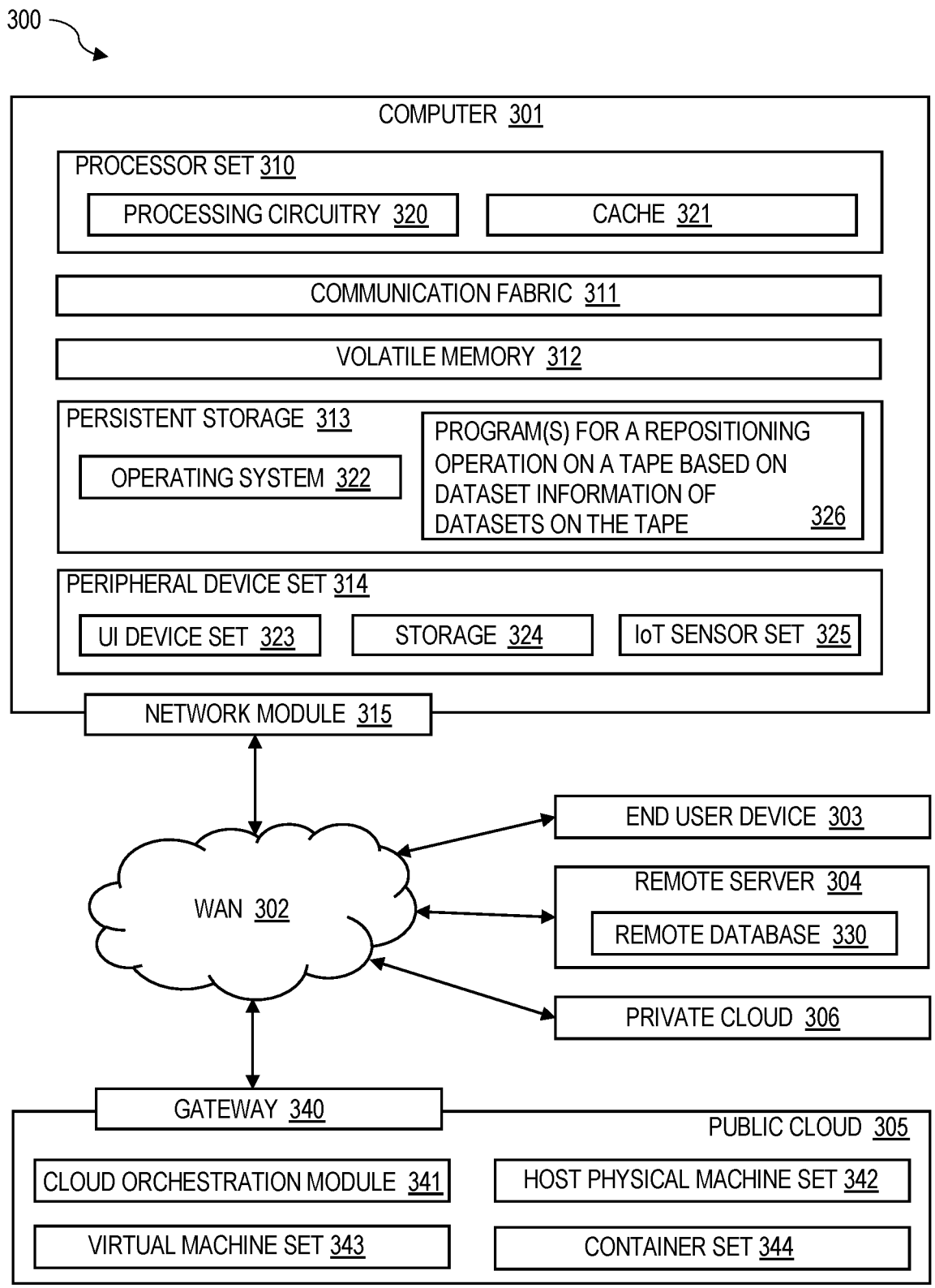
FIG. 3 is a systematic diagram illustrating an example of an environment for the execution of at least some of the computer code involved in performing a repositioning operation on a tape medium based on dataset information, in accordance with one embodiment of the present invention.

An embodiment using a Linear Tape File System (LTFS) is discussed below; however, it should be appreciated that there is no limitation on features such as timing of transmitting the dataset information to the host. The LTFS is hosted by a computer system or server. The computer system or server may be any electronic device capable of receiving input from a user, executing computer program instructions, and communicating with another computing system or another server. Computer 301 shown in FIG. 3 is an example of the computer system or server.

The LTFS is configured to perform a process of writing metadata (or index) on a tape medium in a predetermined time interval (e.g., every five minutes) in an initial setting. A process of writing metadata on an tape medium is referred to as a sync operation. Upon an occurrence of a sync operation, HRTD information having been accumulated is transmitted to the host.

Since the enterprise tape drive TS1170 has the maximum data transfer rate of 400 MB/sec, about 40 datasets can be written per second. This means that the number of datasets to be written in 5 minutes is 12000 datasets; the number of datasets being written in 5 minutes is calculated as follows: (40 datasets per second)×(60 secs)×(5 mins)=12000 datasets. The volume of data for HRTD information of 12000 datasets is 360 KB; the volume of the data for HRTD information is calculated as follows: (12000 datasets)×(30 bytes per dataset)=360000 bytes=360 KB. This is a realistic size of data volume that can be stored in the main memory and transmitted to or received from the host between writing processes.

FIG. 1 is a flowchart showing operational steps of sending dataset information to a host during a sync operation on a tape medium, in accordance with one embodiment of the present invention. The operational steps are executed by a Linear Tape File System (LTFS) hosted by a computer system or server. The computer system or server may be any electronic device capable of receiving input from a user, executing computer program instructions, and communicating with another computing system or another server. Computer 301 shown in FIG. 3 is an example of the computer system or server.

In step 101, the LTFS starts a write operation on a tape medium. In step 102, the LTFS writes a dataset on the tape medium. In step 103, the LTFS determines whether a sync operation on a tape medium starts. The LTFS performs a process of writing metadata (or index) on the tape medium in a predetermined time interval (e.g., 5 minutes). In response to determining that the sync operation on a tape medium does not start (NO branch of step 103), the LTFS reiterates step 102 and continues to write the dataset on the tape medium.

In response to determining that the sync operation on a tape medium starts (YES branch of step 103), in step 104, the LTFS writes a first filemark (FM) on the tape medium. When the first FM is written, there is a flashing operation to write all data stored in a buffer of a tape drive on the tape medium, in which positions of all data on the tape medium are defined.

In step 105, the LTFS obtains dataset information of the dataset on the tape medium. The dataset information includes positions of all the data on the tape medium. The LTFS obtains such defined dataset information by a reading buffer command. In step 106, the LTFS sends the dataset information to a host. The LTFS stores the dataset information in the host.

In step 107, the LTFS writes an index on the tape medium. At step 108, the LTFS writes a second filemark on the tape medium. In step 109, the LTFS determines whether to continue the write operation. In response to determining that the write operation is to be continued (YES branch of step 109), the LTFS reiterates steps 102-109. In response to determining that the write operation is not to be continued (NO branch of step 109), in step 110, the LTFS finishes the write operation.

In some embodiments, the dataset information may be stored for all datasets. In some other embodiments, the dataset information may be stored for datasets that will need to be repositioned subsequently; such as a dataset that is located at the beginning of a file and likely to be targeted for repositioning.

The dataset information may be written on the tape medium at the same time as being transmitted to the host. Therefore, the dataset information can be obtained from the tape medium if the host loses the dataset information.

In a first method, dataset information of the dataset written after a last sync operation is written in the index. To restore the dataset information of all datasets, a rollback function of the LTFS is used to trace down the indexes so that all the dataset information in the indexes can be obtained to allow reconstruction of all the dataset information. However, all the dataset information needs to be read throughout the indexes on the tape medium for restoration; this process requires a long time.

In a second method, dataset information of all datasets written from the beginning of the tape medium to a current position is obtained from the host and written in an index. In this method, the rollback function is not required to restore data and all the dataset information can be restored by reading the last index. However, the size of the last index increases, resulting in taking up space on the tape medium.

In a third method, the dataset information for all datasets written from the beginning of the tape medium to a current position is obtained from the host and written after an index. To additionally write further user data after the sync operation, the user data is written immediately after the index by overwriting the dataset information. This process will leave the dataset information for all the datasets to be written only at the end of a last index. This process solves a problem of the first method mentioned above: time for restoration. Furthermore, this process solves a problem of the second method mentioned above: taking up space on the tape medium. However, for example, if writing is not completed normally due to a writing error, the dataset information will be lost.

A tape medium is divided into 2 partitions: an index partition and a data partition. The LTFS uses the index partition to store a latest index of the tape medium, and the LTFS uses the data partition to store user data and indexes which are generated periodically during the write operation. In a fourth method. The LTFS writes the dataset information of all datasets in addition to indexes into the index partition. When a tape medium is unloaded from a tape drive, the dataset information for all the datasets is written in the index partition. Because the dataset information is written only at the time of unloading, any additional writing process on the data partition is not required. However, in the same manner as the third embodiment mentioned above, the dataset information will be lost in the case of failing to normally complete writing.

Any one of the above-mentioned methods may be adopted. The above methods may also be combined; for example, the dataset information is stored on a data partition according to the first method and then stored on the index partition according to the fourth method. In some embodiments, the LTFS may prompt a user to select one the methods.

The above-mentioned the first, second, or fourth requires change of the LTFS format to write the dataset information in indexes, because the current LTFS format does not allow the dataset information to be stored in LTFS indexes. However, the above-mentioned third method does not require change of the LTFS format, because the above mentioned third method does not store the dataset information in LTFS indexes.

Figure 2:
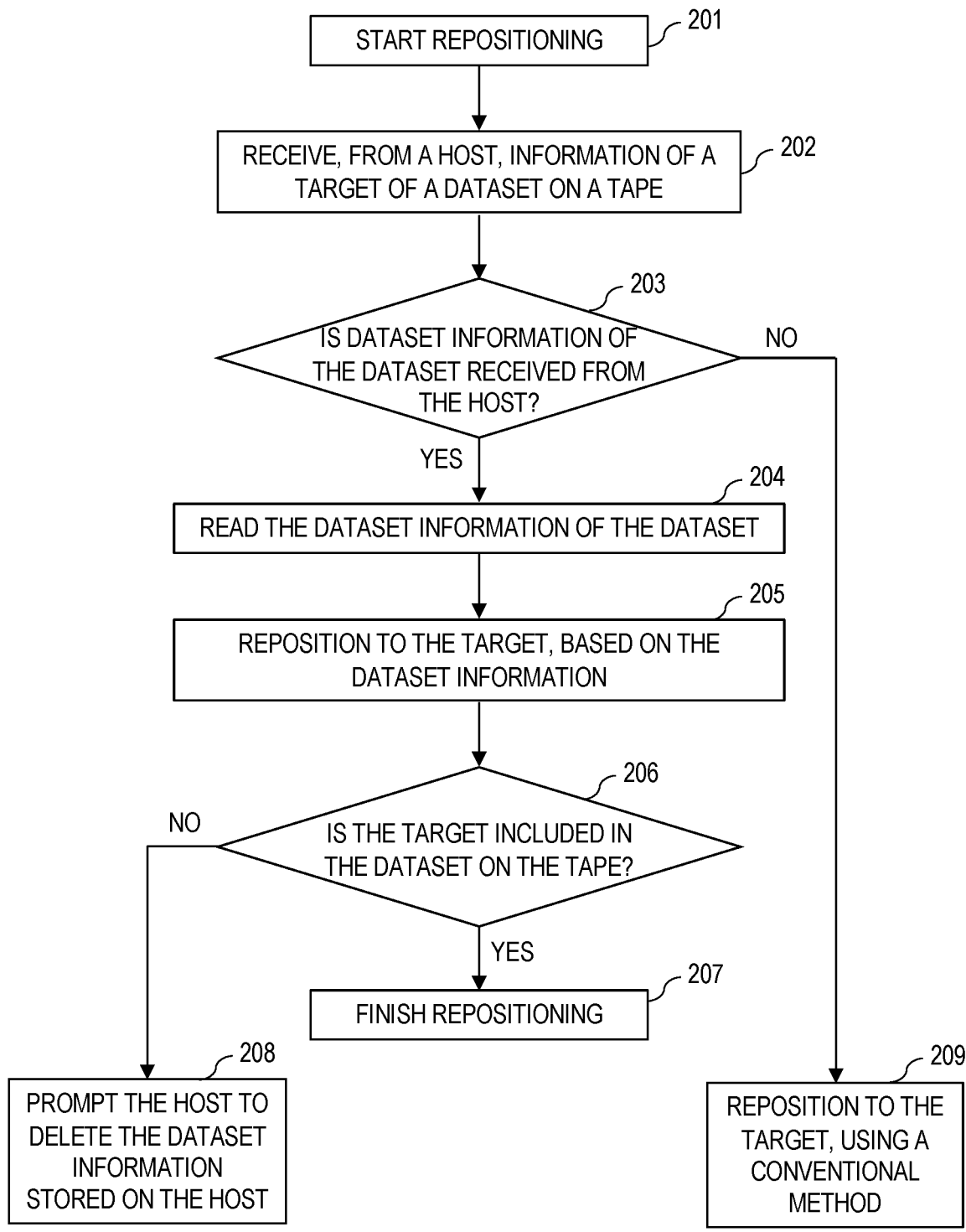
FIG. 2 is a flowchart showing operational steps of performing a repositioning operation on a tape medium based on dataset information, in accordance with one embodiment of the present invention.

FIG. 2 is a flowchart showing operational steps of performing a repositioning operation based on dataset information, in accordance with one embodiment of the present invention. The operational steps are executed by a Linear Tape File System (LTFS) hosted by a computer system or server. The computer system or server may be any electronic device capable of receiving input from a user, executing computer program instructions, and communicating with another computing system or another. Computer 301 shown in FIG. 3 is an example of the computer system or server.

In step 201, the LTFS starts a repositioning operation. In step 202, the LTFS receives, from a host, information of a target of a dataset on a tape medium. The information of the target includes a target record and filemarks. In step 203, the LTFS determines whether dataset information of the dataset is received from the host. The dataset is where the target exists. The dataset information has been saved by the host using one of methods described in previous paragraphs of this document. The host transmits the information of the target (including the target record and filemark numbers) and the dataset information to a tape drive. Means for transmitting the target information and the dataset information may be by extending commands (LOCATE, SPACE) issued to perform reposition or by adding a new mode to WRITE BUFFER command.

In response to determining that the dataset information of the dataset is not received from the host (NO branch of step 203), in step 209, the LTFS repositions to the target, using a conventional method.

In response to determining that the dataset information of the dataset is received from the host (YES branch of step 203), in step 204, the LTFS reads the dataset information of the dataset. In step 205, the LTFS repositions to the target, based on the dataset information. The tape drive refers to the dataset information and rapidly moves to a position immediately before the target to read out the target. This allows reading the target by directly moving to a position immediately before the target during reposition, whereby deterioration of the tape media can be prevented.

In step 206, the LTFS determines whether the target is included in the dataset on the tape medium. In response to determining that the target is included in the dataset (YES branch of step 206), in step 207, the LTFS finishes the repositioning operation. If the target is included in the dataset specified by the host, the process simply moves onto reporting of completion of the reposition operation.

In response to determining that the target is not included in the dataset (NO branch of step 206), in step 208, the LTFS prompts the host to delete the dataset information stored on the host. If the target is not included, the dataset information held by the host is inconsistent with the state of the tape medium. In such a case, the tape drive returns a specific error to the host which is prompted to delete dataset information. When the host is notified of a fault in the dataset information by the tape drive, the host deletes the dataset information held on the host and requests the reposition operation by a conventional method without specifying the dataset information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In FIG. 3, computing environment 300 contains an example of an environment for the execution of at least some of the computer code involved in performing the inventive methods, such as program(s) 326 for a repositioning operation on a tape based on dataset information of datasets on the tape. In addition to block 326, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and block 326, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located off chip. In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in block 326 in persistent storage 313.

Communication fabric 311 is the signal conduction path that allows the various components of computer 301 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface type operating systems that employ a kernel. The code included in block 326 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as images. A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

What is claimed is:

1. A computer-implemented method comprising:
   obtaining dataset information of a dataset on a tape medium in a sync operation, wherein the dataset information written after a last sync operation is written in an index, wherein the dataset information includes positions of data in the dataset;
   sending the dataset information of the dataset to a host;
   in response to starting a repositioning operation, receiving, from the host, the dataset information of the dataset;
   reading the dataset information of the dataset; and
   repositioning to a target on the tape medium, based on the dataset information of the dataset, wherein a tape drive refers to the dataset information and moves to a position immediately before the target.

2. The computer-implemented method of claim 1, further comprising:
   determining whether the target is included in the dataset;
   in response to determining that the target is not included in the dataset, prompting the host to delete the dataset information; and
   finishing the repositioning operation by a conventional method without the dataset information.

3. The computer-implemented method of claim 1, wherein the host transmits the dataset information to the tape drive.

4. The computer-implemented method of claim 3, wherein transmitting the dataset information is by extending commands issued to perform the repositioning operation.

5. The computer-implemented method of claim 3, wherein transmitting the dataset information is by adding a new mode to a write buffer command.

6. A computer-implemented method comprising:
   obtaining dataset information of a dataset on a tape medium in a sync operation, wherein the dataset information of all datasets written from a beginning of the tape medium to a current position is written in an index, wherein the dataset information includes positions of data in the dataset;
   sending the dataset information of the dataset to a host;
   in response to starting a repositioning operation, receiving, from the host, the dataset information of the dataset;
   reading the dataset information of the dataset; and
   repositioning to a target on the tape medium, based on the dataset information of the dataset, wherein a tape drive refers to the dataset information and moves to a position immediately before the target.

7. The computer-implemented method of claim 6, further comprising:
   determining whether the target is included in the dataset;
   in response to determining that the target is not included in the dataset, prompting the host to delete the dataset information; and
   finishing the repositioning operation by a conventional method without the dataset information.

8. The computer-implemented method of claim 6, wherein the host transmits the dataset information to the tape drive.

9. The computer-implemented method of claim 8, wherein transmitting the dataset information is by extending commands issued to perform the repositioning operation.

10. The computer-implemented method of claim 8, wherein transmitting the dataset information is by adding a new mode to a write buffer command.

11. A computer-implemented method comprising:
    obtaining dataset information of a dataset on a tape medium in a sync operation, wherein the dataset information of all datasets written from a beginning of the tape medium to a current position is written after an index, wherein the dataset information includes positions of data in the dataset;
    sending the dataset information of the dataset to a host;
    in response to starting a repositioning operation, receiving, from the host, the dataset information of the dataset;
    reading the dataset information of the dataset; and
    repositioning to a target on the tape medium, based on the dataset information of the dataset, wherein a tape drive refers to the dataset information and moves to a position immediately before the target.

12. The computer-implemented method of claim 11, further comprising:
    determining whether the target is included in the dataset;
    in response to determining that the target is not included in the dataset, prompting the host to delete the dataset information; and
    finishing the repositioning operation by a conventional method without the dataset information.

13. The computer-implemented method of claim 11, wherein the host transmits the dataset information to the tape drive.

14. The computer-implemented method of claim 13, wherein transmitting the dataset information is by extending commands issued to perform the repositioning operation.

15. The computer-implemented method of claim 13, wherein transmitting the dataset information is by adding a new mode to a write buffer command.

* * * * *